United States Patent [19]

Hughes

[11] 4,209,253
[45] Jun. 24, 1980

[54] LASER RADAR TRACKING SYSTEM

[76] Inventor: John L. Hughes, 34 Nungara Pl., Aranda, Canberra, Australia, 2614

[21] Appl. No.: 907,603

[22] Filed: May 19, 1978

Related U.S. Application Data

[63] Continuation of Ser. No. 737,912, Nov. 2, 1976.

[30] Foreign Application Priority Data

Nov. 3, 1975 [AU] Australia .................. PC3825

[51] Int. Cl.² .............. G01B 11/26; G01C 3/08; G02B 23/02; G05D 25/00
[52] U.S. Cl. .................. 356/152; 250/203 R; 350/22; 350/285; 350/301; 356/4; 356/5
[58] Field of Search ............ 356/4, 5, 141, 152, 356/28; 350/21-26, 301, 285

[56] References Cited

U.S. PATENT DOCUMENTS

| 1,520,245 | 12/1924 | Humbrecht | 350/22 |
|---|---|---|---|
| 2,184,615 | 12/1939 | Gunther | 350/24 |
| 3,615,135 | 10/1971 | Frazer | 356/29 |
| 3,811,774 | 5/1974 | Honeycutt et al. | 356/28 |
| 3,868,169 | 2/1975 | Pfenninger et al. | 350/22 |
| 4,087,061 | 5/1978 | Burt | 244/3.16 |

FOREIGN PATENT DOCUMENTS 400869  2/1974  U.S.S.R. .................. 350/24

Primary Examiner—S. C. Buczinski

[57] ABSTRACT

A high precision laser radar tracking system is described. Targets which can be tracked include diffuse passive targets, specular passive targets and optical transponders. The base section of the system is fixed relative to the upper section which can rotate through 360°. The lower section has a laser beam generator, optical signal detector system with a beam splitter/reflector and the upper section has three moveable reflectors one of which acts as a trackable, transmitter/receiver aperture. The system of the invention incorporates techniques utilizing the advantages that emanate from the combination of a laser system and an optical radar system.

2 Claims, 3 Drawing Figures

LASER RADAR TRACKING SYSTEM

This is a continuation of application Ser. No. 737,912 filed Nov. 2, 1976.

FIELD OF THE INVENTION

This invention relates to a high precision laser radar tracking system which can monitor the path or orbit of low and high speed targets which may or may not be fitted with comparative reflectors of laser radiation such as passive retro reflectors or actual optical transponders.

BACKGROUND OF THE INVENTION

There are two basic types of laser radar systems currently in use, one type utilizes the same optical system to transmit and detect the laser signal whilst the other type of system utilizes separate transmission and detection systems which are usually placed side by side with respect to each other.

These prior art co-axial systems utilize large telescopes to collimate the laser beam into a highly parallel beam. An example of such laser radar systems of this type are those currently in use to track the passive retro-reflector arrays which have been positioned on the surface of the moon by the Apollo missions of the United States and the Lunakhod missions of the Soviet Union. The reason that such large telescopes have to be used in this type of laser radar system arises because the pulsed ruby lasers used to generate the laser signal are far from optimum, producing a laser beam with a divergence far above that predicted theoretically. On the other hand, the overall efficiency of the ruby lunar ranging systems currently in use, i.e. about $10^{-16}\%$ are so low that the light gathering capacity of a large telescope is of considerable, and perhaps decisive, advantage in such a laser radar system. On the other hand, with the continual improvement in lasers, the laser used as a beam generator in a laser radar transmitter will provide beams of increasing quality both regarding their divergence and power levels. These improvements allow the large telescopes to be dispensed with at least as far as the transmitter is concerned. Possibly, a much poorer optical quality detector telescope could be used to enhance the detection capability of a laser radar system which relied solely on the high quality of its output laser beam for its overall performance. On the other hand, with the increase in transmitted power in high quality output beams, the detector portion of a laser radar system is considerably simplified and sufficient signal can be detected by utilizing the transmitter optics as part of the optical system of the detector. Such a process of duplicating the use of high precision and expensive optical components for both the transmission and detection portions of an optical radar system significantly lowers the overall installation and operating costs of such a radar system. However, slowing the transmission and detector optics does give rise to considerable difficulties when the output pulse repetition rate of the laser radar system is increased to such a level that it becomes impossible to switch from transmission to detection paths and vice versa. This difficulty is overcome in the present invention by purposely wasting up to 50% of the output signal and up to 50% of the echo signal collected for detection.

Many of the prior art laser radar systems have the laser beam generator as an integral part of the moving portion of the laser tracking system. This is inadvisable due to the fact that a sensitive laser system should not be moved unnecessarily particularly if it consumes a relatively large amount of electrical power which in turn necessitates very heavy electrical cables from a fixed site power source, a process which inevitably limits both the motion and precision capabilities of any such laser radar system. A prior art laser radar system which incorporates many of the required characteristics of a versatile laser radar system is now under construction in Hawaii, at the Haleakala Lunar Laser Ranging Observatory. This laser radar system has been designed to track the lunar retro-reflectors so that the Earth-moon separation can be determined to better than 10 cms. It consists of a Neodymium doped yttrium aluminium-garnet laser pulse generator which emits a near diffraction limited laser beam output. This means that the output beam is sufficiently collimated so that the use of a large telescope is not required to provide a sufficiently intense photon flux density on the surface of the moon. In fact, after the 1.06 micron output of the laser transmitted has been partially converted to a more conveniently detectable second harmonic wavelength (0.53 microns) the beam is expanded in a relatively small telescope and directed onto the surface of a steerable mirror which directs the beam onto the correct location on the surface of the moon where a small portion of it can be reflected back via any one of the passive retro-reflector arrays to be detected by a conventional optical telescope-detector system at the sight station. However, despite the fact that the Haleakala lunar laser radar installation utilizes some of the latest techniques, not only are these highly restricted in their scope in this particular installation but they are utilized only in the transmission side, the detection side being quite conventional.

SUMMARY OF THE INENTION

In one aspect this invention provides a laser radar system with a common transmitter/receiver optical path consisting of an upper and lower section, the lower section being fixed and containing a laser beam generator and optical signal detector system with a beam splitter/reflector to combine or separate their respective beam paths which directs the outgoing optical beam path into the upper section which is fully balanced to rotate about the vertical axis through an angle of approximately 360° with respect to the lower fixed section and contains three moveable reflectors to guide the beam path, one of which acts as a trackable, transmitter/receiver aperture.

Further in another aspect this invention provides a laser radar system with a common transmitter/receiver optical path defined by three beam reflectors and a beam splitter/reflector which combines or separates the optical paths of a beam generator-detector system into a single beam path which is then directed up a vertical axis, the beam splitter/reflector being the lowest of three reflectors centred on the same vertical axis above each other, the second reflector being moveable relative to the first beam splitter/reflector in such a manner that the beam path is deflected away from the vertical axis onto a fourth reflector appropriately positioned in a plane perpendicular to the vertical axis and intersecting it near or at the upper reflector which acts as a transmitter/receiver aperture, the beam path being deflected onto this aperture by the off axis reflector.

Preferably the beam splitter/reflector is such as to allow any ratio of output to input signal or signals. Desirably the coatings of the reflectors and beam splitter/reflector are such as to permit the use of any wavelength or of more than one wavelength or harmonics of such wavelength. The field of view of the aperture reflector may cover any angle from horizon to about 20° beyond zenith relative to that horizon in a vertical plane and a 360° rotation in a horizontal plane so that the cone of view has an apex angle of 180° approximately. A booster amplifier may be positioned after the beam splitter to enhance both the outgoing and incoming laser beam signal or either one at the same or different gain levels.

Provision may be made for an additional off vertical axis reflector in line with and in the same plane as, but on the opposite side of the aperture mirror to the first off vertical axis reflector, which can be used in the optical path when tracking through zenith by flipping over the aperture reflector and the lower moveable reflector thus providing a continuous track without having to rotate the upper portion of the laser radar system through an angle of 180°.

BRIEF DESCRIPTION OF THE DRAWINGS

The invention may be understood more readily when regard is given to the following description of preferred aspects, taken in conjunction with the drawings which are illustrative of the invention only.

In the drawings.

DETAILED DESCRIPTION

Figure 1:
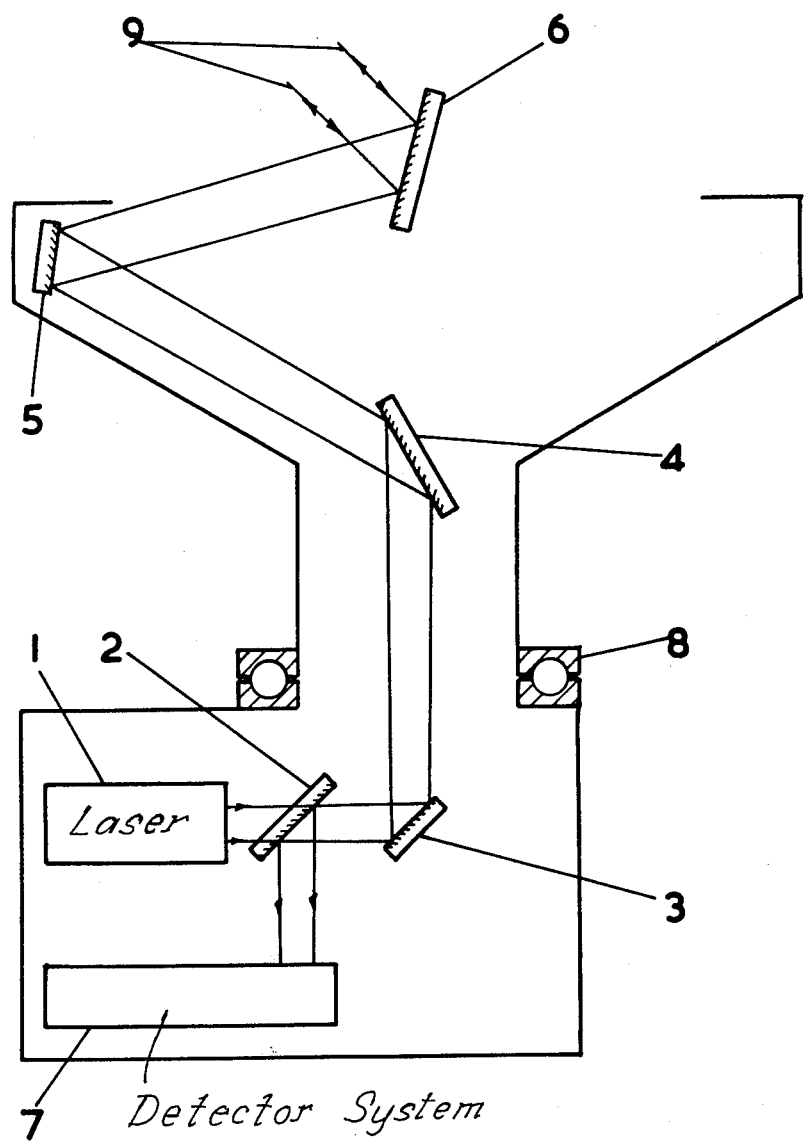
FIG. 1 shows a schematic layout of the tracking system.

Now referring to FIG. 1, 50% of the output of the laser (1) is passed through the 50:50 beam splitter (2) onto the fixed 45° reflector (3). The laser output is then reflected off another 45° reflector (4) which can rotate relative to (3) in such a manner that the laser output can be directed onto the output reflector (6) via reflector (5). Reflectors (4), (5) and (6) all rotate relative to reflector (3) and can also be moved relative to each other if required. Normally reflectors (4) and (5) are fixed whilst reflector (6) acts as the tracking output reflector. The bearing (8) rotates the upper section relative to the lower section. The light beam is designated by numeral 9. Reflector (6) has about 360° movement in the horizontal plane and usually about a 20°–120° movement in the vertical plane whilst in operation.

The laser output energy is directed onto the target by the output reflector (6) which also collects any signal reflected or redirected by the target. This reflected signal, which may be less or greater than the output signal depending on the target, is then directed back down the optical path of the tracker via reflectors (5), (4), (3) and (2) into the detector system (7).

Figure 2:
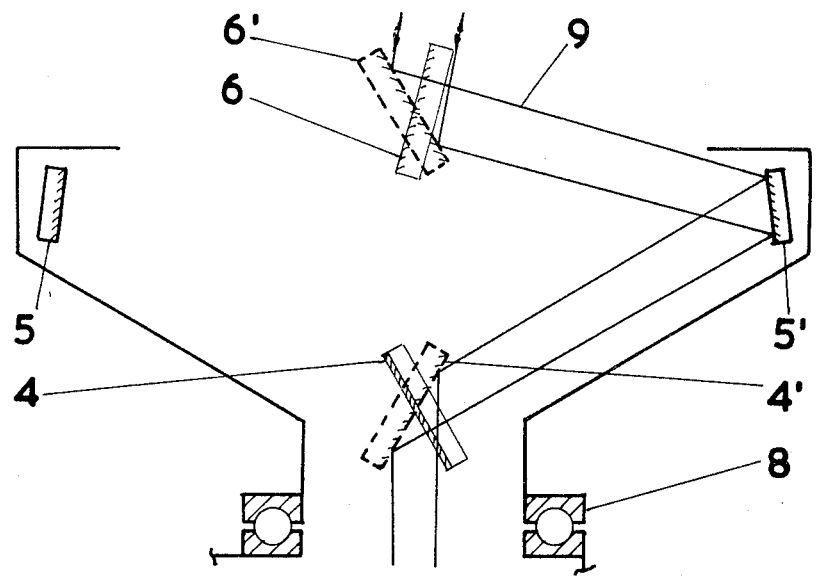
FIG. 2 shows an alternative optical path system of the upper section.

It is of considerable advantage in any radar system if it can track a target through zenith, i.e. directly overhead, without having to make a 180° turn. The present invention allows tracking from horizon to about 20° beyond zenith without having to make a 180° turn. This embodiment is illustrated in FIG. 2 where reflectors (4) and (6) are flipped through 180° to positions 4' and 6' so that the beam from reflector (3) is diverted onto a second reflector 5' (which is similar to and vertically opposite reflector (5)). The new beam path position is accepted by 6'. In this way it is possible to track from horizon to horizon via zenith without turning the upper portion of the radar system through an angle of 180°.

Figure 3:
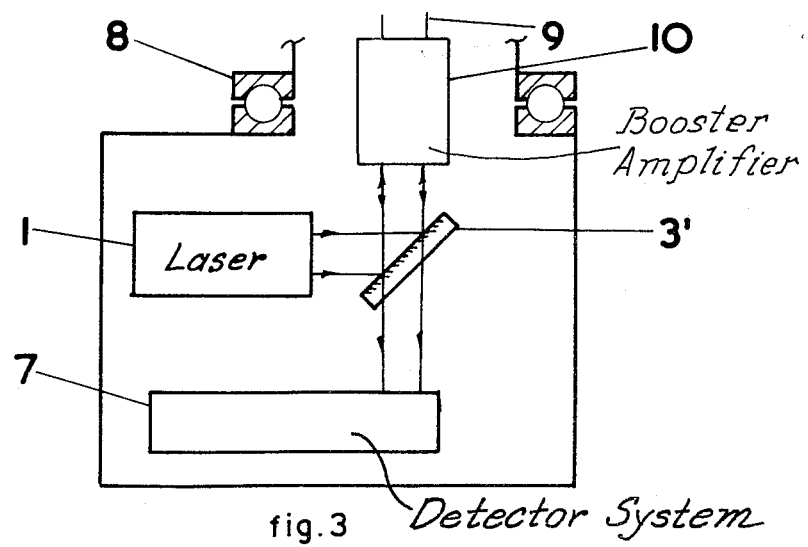
FIG. 3 shows the beam splitter/reflector combined and the booster amplifier.

In FIG. 3, a configuration is shown where the beam splitter and reflector are combined into one component (3).

(2) is a beam splitter which allows the beam paths of laser beam generator (1) and optical signal detector (7) to be combined to be reflected off reflector (3). Beam splitter (2) can allow the whole or part of laser beam from (1) through and can direct the whole or part of the return signal onto (7).

Beam splitter (2) normally is positioned at 45° with respect to the beam axis from (1). However, if it acted as a splitter of a polarized beam then it could be positioned at a more appropriate angle, for example at about 60° with respect to the axies of the laser beam so that beam paths (1) and (7) are not positioned at right angles with respect to each other.

(3) is normally positioned at an angle of 45° with respect to the axis of the laser beam from (1) and reflects up to 100% of the signal incident on it both outgoing and return.

(4) is usually a 100% reflector which diverts the beam path away from the vertical axis of the laser radar system onto reflector (5).

(5) is a 100% reflector which accepts the beam diverted off the vertical axis by reflector (4) and redirects it onto the surface of the tracking mirror (6). Reflector (5) moves in a circle about the vertical axis containing reflectors (6) (4) and (3). It can also be adjusted to be at a higher level than the plane containing tracking mirror (6), within that plane or below it. When (5) is below the plane containing mirror (6), it is possible to track a target from horizon to horizon whilst with (5) above the plane containing (6), it is possible to track through zenith to an angle much greater than 90° relative to the horizon. Under conditions of very rapid tracking through or near zenith it may be advantageous to use a similar reflector 5' on the opposite side of the tracking mirror (6) to (5) and move reflectors (4) and (6).

The 100% reflector (6) can be accurately steered so that the laser beam can be pinpointed onto target. This requires, e.g. two sets of 21 bit encoders, one set for each axis to position the beam within arc seconds. Naturally, movement of such accuracy has to be computer controlled as is known in the art.

Mirror (6) normally has a diameter about twice that of the laser beam, which in turn has a diameter determined by both the damage threshold of the reflector surfaces and the required collimation of the beam. For precision laser radar to the moon reflectors, the diameter of the reflector (6) would be about 60 cms. The larger the diameter the more its effectiveness as an optical receiver. However, the larger the mirror (6) the more difficult it becomes to control with high precision.

The base section has to be fixed relative to the top section which can rotate up to 360° relative to the base. Thus, e.g. the base can be a fixed site on Earth, either on land or on sea, e.g. on a ship, or an aircraft in flight.

The high precision laser tracking system of this invention incorporates techniques which fully utilize the unique advantages that any laser system can contribute to an optical radar system. In particular the highly collimated nature of any high quality laser beam generator system is fully utilized because the transmitted beam can be directed anywhere within a conical volume with apex angle of approximately 180° utilizing the laser output beam from a fixed site laser system which enters the conical volume at its apex.

Three basic targets which can be tracked with very high precision by the present invention are:

(a) Diffuse passive targets which return a relatively small fraction of the incident. Such targets can be tracked up to ranges of several tens of kilometers before the signal echo becomes too weak to provide an adequate signal to noise ratio.

(b) Specular passive targets which return a significant fraction of the incident laser beam but only in specific directions. Such specular targets could consist of a highly polished metal plate, any type of mirror or corner cubes of the type used in the passive retro-reflector arrays on the moon used for lunar laser ranging.

(c) Optical transponders. An optical transponder target is one where the incident beam is collected and amplified prior to its return to the laser tracker system. With this type of target it is possible to detect a target echo that is much stronger than the transmitted signal. Such transponder targets are essential for precision ranging over very large distances and planetary laser ranging would be impossible without some form of optical transponder tracking.

A booster amplifier may be included between the fixed, lower beam splitter/reflector and the first moveable reflector, to boost both the outgoing and incoming signals.

The booster amplifier can be excited in the long pulse mode so that once activated it can amplify both the outgoing and incoming signal or alternatively it can be excited very rapidly so that it can enhance both signals independently. Naturally the gain of the booster amplifier should be such that the incoming signal is enhanced above the additional noise generated by the spontaneous decay emissions from the amplifier otherwise there would be no detection advantage. A booster amplifier of this type which enhances both the outgoing and incoming signal considerably enhances the signal to noise ratio for the laser tracking system as a whole.

When used in the pulsed mode, the pulse repetition rate of the present invention is not limited by the switching time from one optical path to the other, i.e. from the outward to incoming paths. In prior art, coaxial systems, a moveable mirror is used to direct the beam path from laser generator to signal detector systems. This mechanical device limits the pulse repetition rate possible to one pulse every few seconds. To increase the pulse repetition rate it is necessary to use a completely separated transmitter and receiver optical paths. In the present invention, the pulse repetition rate is not limited by the coaxial nature of the outward and return optical paths.

I claim:

1. A laser radar system with a common transmitter/receiver optical path consisting of an upper and lower section, the lower section being fixed and containing a laser beam generator and optical signal detector system with a beam splitter/reflector to combine or separate their respective beam paths and to direct the outgoing optical beam path into the upper section, said upper section being fully balanced to rotate about the vertical axis through an angle of approximately 360° with respect to the lower fixed section, and said upper section containing three movable reflectors at different heights to guide the beam path, a first one of said reflectors acting as a trackable, transmitter/receiver aperture, a second one of said reflectors being positioned off the vertical axis, and a third one of said reflectors being positioned lower than said first and second reflectors, and there is provided a fourth reflector positioned off the vertical axis and in line with and in the same plane as said second reflector but on the opposite side of the aperture reflector, which can be used in the optical path when tracking through zenith by flipping said aperture reflector and the third reflector through 180° from the positions they occupied prior to tracking through zenith, thus providing a continuous track without having to rotate the upper section of the laser radar system through an angle of 180°.

2. A laser radar system with a common transmitter/receiver optical path defined by three beam reflectors and a beam splitter/reflector, two of said beam reflectors being located above the splitter/reflector and along the same vertical plane, the third reflector being located above but axially displaced from said splitter/reflector, said third reflector being positioned to reflect light from the lowest positioned axial reflector to the highest positioned axial reflector, said highest positioned axial reflector acting as a transmitter/receiver aperture, and there is provided a fourth reflector located axially displaced from said splitter/reflector in line with and in the same plane as said third reflector but on the opposite side of said aperture reflector, which can be used in the optical path when tracking through zenith by flipping said aperture reflector and said lowest positioned axial reflector through 180° from the positions they occupied prior to tracking through zenith, thus providing a continuous track without having to rotate the upper portion of the laser radar system through an angle of 180°.

* * * * *